(12) United States Patent
Andersson

(10) Patent No.: US 9,557,781 B2
(45) Date of Patent: Jan. 31, 2017

(54) ADJUSTING COORDINATES OF TOUCH INPUT

(75) Inventor: Henric Andersson, San Jose, CA (US)

(73) Assignees: Sony Corporation, Tokyo (JP); Sony Mobile Communications Inc, Tokyo (JP)

(*) Notice: Subject to any disclaimer, the term of this patent is extended or adjusted under 35 U.S.C. 154(b) by 244 days.

(21) Appl. No.: 13/823,860

(22) PCT Filed: Jan. 5, 2012

(86) PCT No.: PCT/IB2012/020261
§ 371 (c)(1),
(2), (4) Date: Mar. 15, 2015

(65) Prior Publication Data
US 2016/0011719 A1    Jan. 14, 2016

(51) Int. Cl.
*G06F 1/16* (2006.01)
*G06F 3/0488* (2013.01)

(52) U.S. Cl.
CPC .......... *G06F 1/1694* (2013.01); *G06F 3/0488* (2013.01)

(58) Field of Classification Search
CPC ...... G06F 3/0346; G06F 3/0418; G06F 3/038; G06F 3/0414; G06F 3/03547; G06F 1/1694
USPC .................................................. 345/173–178
See application file for complete search history.

(56) References Cited

U.S. PATENT DOCUMENTS

| | | | |
|---|---|---|---|
| 5,973,676 A * | 10/1999 | Kawakura | G06F 3/04847 345/173 |
| 2008/0167858 A1 | 7/2008 | Christie et al. | |
| 2009/0100384 A1 | 4/2009 | Louch | |
| 2010/0194692 A1 * | 8/2010 | Orr | G06F 3/0414 345/173 |
| 2012/0013570 A1 * | 1/2012 | Murata | G06F 3/04883 345/174 |
| 2012/0038555 A1 * | 2/2012 | DeLuca | G06F 1/1694 345/168 |
| 2012/0038557 A1 * | 2/2012 | DeLuca | G06F 3/0346 345/169 |
| 2012/0154294 A1 * | 6/2012 | Hinckley | G06F 1/1649 345/173 |
| 2012/0306768 A1 * | 12/2012 | Bailey | G09G 5/00 345/173 |

(Continued)

FOREIGN PATENT DOCUMENTS

| | | |
|---|---|---|
| EP | 1868068 A1 | 12/2007 |
| JP | 2010224750 | 10/2010 |

OTHER PUBLICATIONS

International Search Report and Written Opinion issued in application PCT/IB2012/020261 dated Sep. 26, 2012.

*Primary Examiner* — Kumar Patel
*Assistant Examiner* — Vinh Lam
(74) *Attorney, Agent, or Firm* — Tucker Ellis LLP

(57) ABSTRACT

A device may include a touch sensor for determining portions of a touchscreen display that receive touch inputs, and a motion sensor for identifying device motions of the device. Additionally, the device may include a processor to identify coordinates of a portion of the touchscreen display that receives a touch input, identify an input instant at which the touchscreen display receives the touch input, and determine a change of device motion that affects an accuracy of the coordinates of the touch input based on the input instant. In addition, the processor may adjust the coordinates based on the determined change of device motion.

17 Claims, 7 Drawing Sheets

(56) References Cited

U.S. PATENT DOCUMENTS

2013/0033433 A1\* 2/2013 Rogers ............... G06F 3/04886
 345/173
2013/0176264 A1\* 7/2013 Alameh ................ G06F 3/038
 345/174

\* cited by examiner

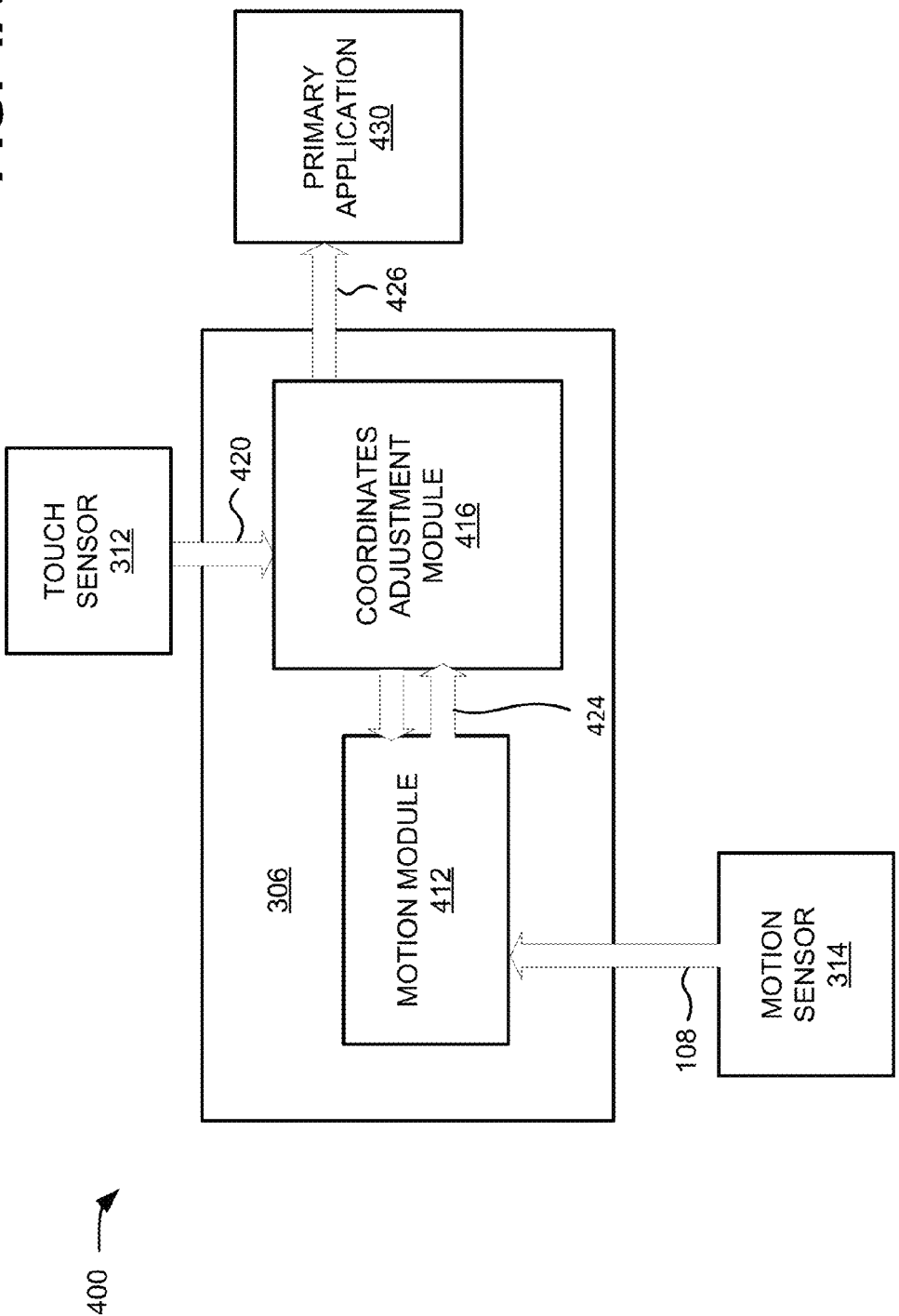

ADJUSTING COORDINATES OF TOUCH INPUT

BACKGROUND

In many types of devices, a user may provide input via a touchscreen. The touchscreen allows the user to interact with graphical user interface (GUI) objects that are shown on the screen display.

SUMMARY

In one implementation, a touchscreen device may include a touch sensor for determining portions of a touchscreen display that receive touch inputs and a motion sensor for identifying device motions of the device. Additionally, the device may include a processor to identify coordinates of a portion of the touchscreen display that receives a touch input, identify an input instant at which the touchscreen display receives the touch input, determine a change, of device motion, that affects an accuracy of the coordinates of the touch input based on the input instant, and adjust the coordinates based on the determined change of device motion.

In addition, the processor may be further configured to associate the adjusted coordinates with a graphical user interface (GUI) object located at the adjusted coordinates at the input instant.

In addition, the processor may be further configured to determine an output associated with the touch input based on the adjusted coordinates, and further adjust the output using a secondary predictive process.

In addition, when determining the change in device motion, the processor may further identify an input motion interval during which changes in the device motion affects the accuracy of the touch input. The input motion interval ends at the input instant. The processor also receives a plurality of device motion values over the input motion interval, and determines the change in device motion based on the plurality of device motion values.

In addition, when identifying the input motion interval, the processor may further provide a simulated touch input test that includes a configuration of graphical user interface (GUI) objects, and determine the input motion interval based on the simulated touch input test.

In addition, when determining the input motion interval based on the simulated touch input test, the processor may further identify an expected touch input at an expected touch location, receive a test touch input at a test touch location, identify a simulated device motion associated with the test touch input, determine a distance between the test touch location and the expected touch location, and determine the input motion interval based on the simulated device motion and the distance between the test touch location and the expected touch location.

In addition, the device may include one of a cell phone, a tablet, an electronic notepad, a gaming console, a laptop computer, a personal digital assistant, or a personal computer.

In addition, the processor may be further configured to determine the change in device motion based on one or more of a yaw, pitch, or roll of the device in a multi-coordinate system.

Additionally, the processor may be further configured to provide the adjusted coordinates as an input for a primary application, wherein the primary application includes one of an email program, a texting program, a web browser, and a gaming application.

According to another implementation, a computer-implemented method may include identifying coordinates, of a portion of the touchscreen display, that receives a touch input, identifying an input instant, wherein the input instant is an instant at which the touchscreen display receives the touch input, and determining a change, of device motion, that affects an accuracy of the touch input based on the input instant. The computer-implemented method may also include adjusting the coordinates based on the determined change of device motion.

In addition, the computer-implemented method may further include associating the adjusted coordinates with a graphical user interface (GUI) object located at the adjusted coordinates.

In addition, the computer-implemented method may further include determining an output associated with the touch input based on the adjusted coordinates, and further adjusting the output using a secondary predictive process.

In addition, when determining the change in device motion, the computer-implemented method may further include identifying an input motion interval during which changes in the device motion affects the accuracy of the touch input. The input motion interval ends at the input instant. The method may also include receiving a plurality of device motion values over the input motion interval and determining the change in device motion based on the plurality of device motion values.

In addition, when identifying the input motion interval, the computer-implemented method may further include providing a simulated touch input test that includes a configuration of graphical user interface (GUI) objects, and determining the input motion interval based on the simulated touch input test.

In addition, when determining the input motion interval based on the simulated touch input test, the computer-implemented method may further include identifying an expected touch input at an expected touch location, receiving a test touch input at a test touch location, identifying a simulated device motion associated with the test touch input, determining a distance between the test touch location and the expected touch location, and determining the input motion interval based on the simulated device motion and the distance between the test touch location and the expected touch location.

In addition, the computer-implemented method may further include determining the change in device motion based on one or more of a yaw, pitch, or roll of the device in a multi-coordinate system.

In addition, the computer-implemented method may further include providing the adjusted coordinates as an input for a primary application, wherein the primary application includes one of an email program, a texting program, a web browser, and a gaming application.

In another implementation, a computer-readable medium including computer-executable instructions, the computer-executable instructions may include instructions to identify coordinates of a portion of the touchscreen display that receives a touch input, identify an input instant. The input instant is an instant at which the touchscreen display receives the touch input. The computer-readable medium also includes instructions to determine a change of device motion that affects an accuracy of the coordinates of the touch input based on the input instant, adjust the coordinates based on the determined change of device motion, and provide the adjusted coordinates as an input for a primary application, wherein the primary application includes one of an email program, a texting program, a web browser, and a gaming application.

In addition, the computer-readable instructions may be executed on a the device including one of a cell phone, an electronic notepad, a gaming console, a laptop computer, a personal digital assistant, or a personal computer.

In addition, the computer-readable instructions include instructions for causing the one or more processors to associate the adjusted coordinates with a graphical user interface (GUI) object located at the adjusted coordinates at the input instant.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 4A is a coordinate adjustment data flow diagram for a portion of the device of FIG. 2;

DETAILED DESCRIPTION

The following detailed description refers to the accompanying drawings.

The same reference numbers in different drawings may identify the same or similar elements. Also, the following detailed description is exemplary and explanatory only and is not restrictive of the invention, as claimed.

In the following, a motion sensor may receive and record a device motion of a touchscreen device at predetermined instances. A touch sensor may receive a touch input from a user. The touchscreen device may determine whether there was a change in the motion of the touchscreen device during a predetermined time preceding the input. The change in motion may correspond to a sudden movement of the touchscreen device in an arbitrary direction. The touchscreen device may compensate for the change in motion to determine the coordinates that the user intended to select.

Figure 1:
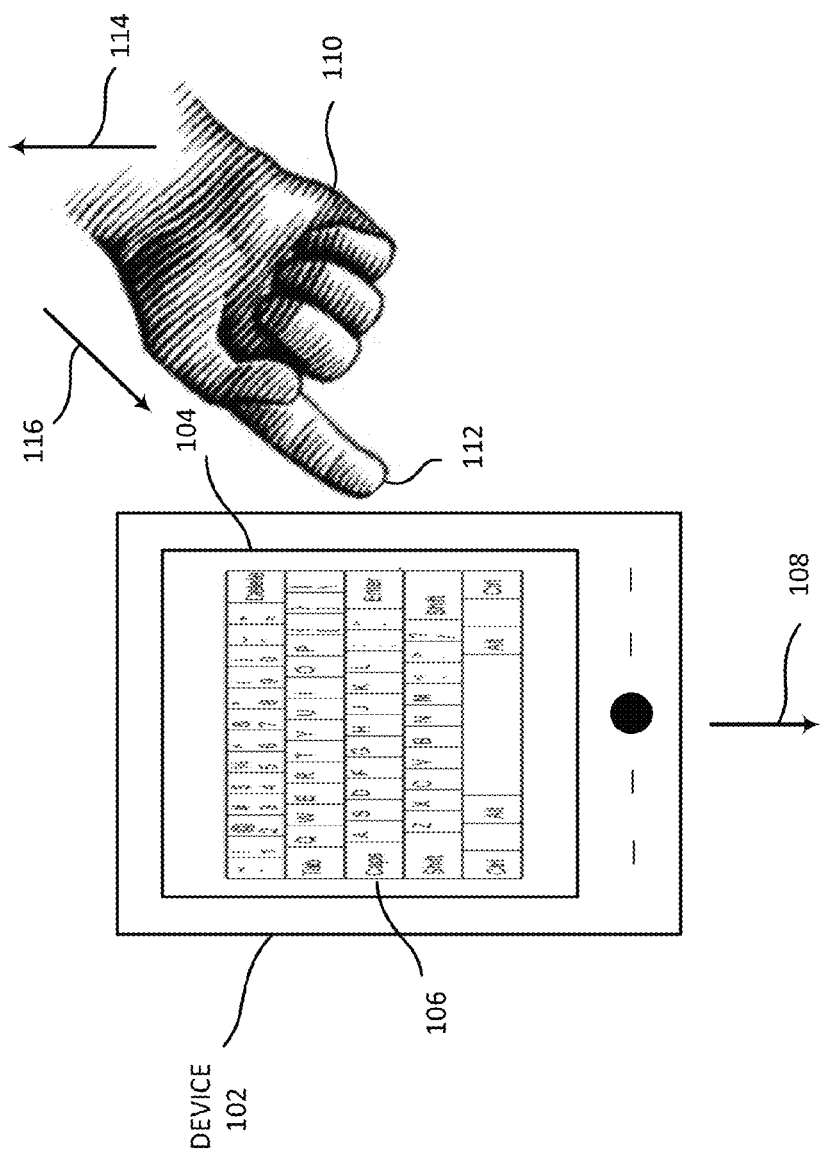
FIG. 1 illustrates the concepts described herein.

FIG. 1 illustrates one implementation of the above concept. FIG. 1 shows a device 102 that may include a touchscreen display 104, which, in turn, may display GUI objects 106 (in this particular instance, keys of an alphanumeric keyboard) that may be located at particular coordinates of touchscreen display 104 at particular times. User 110 may use touchscreen display 104 for user input, for example when composing emails, texting, browsing, etc.

Device 102 may have an associated device motion 108. Device motion 108 may include a velocity (i.e., a speed and a direction) in which device 102 may move. Device 102 may receive an indication of coordinates of a particular GUI object 106 from a touch input that user 110 may apply to touchscreen display 104 using an input instrument 112. User 110 may have an associated user motion 114, which includes a user velocity and user direction, at which input instrument 112 touches device 102 to select GUI objects 106.

When user 110 intends to input selection of a particular GUI object 106 to device 102, for example, a letter key A using a word processing program, user 110 may use input instrument 112 to provide a touch input at a particular portion of touchscreen display 104 at which particular GUI object 106 is displayed. The particular portion of touchscreen display 104 may have coordinates that correspond to particular GUI object 106 in an application and/or memory associated with device 102. For example, the coordinates may correspond to two dimensional coordinates (x, y) in a representation of touchscreen display 104 in a Cartesian coordinate system that is associated with device 102.

User 110 may decide at a particular instant ("the input decision time") to touch the particular portion of touchscreen display 104 at which particular GUI object 106 is located and may begin a motion (selection motion 116) towards touching the particular portion of touchscreen display 104. Selection motion 116 may include a velocity and a direction in which user 110 moves input instrument 112 (e.g., finger or stylus). User 110 may touch user device 102 at the particular portion of touchscreen display 104 at which the particular intended GUI object 106 is located. The time between the input decision time and the input instant may be defined as a user response time. The user response time may include a time between an actual thought of selecting the particular portion of touchscreen display 104 (e.g., the time of the start of the motion) and an actual instant that input instrument 112 touches touchscreen display 104.

In many instances, device motion 108 may be constant in both velocity and direction. If the motion of the body of user 110 is approximately equivalent in both direction and velocity to device motion 108, performing selection motion 116 may allow user 110 to provide input (e.g., via instrument 112) to the particular portion of touchscreen display 104 (i.e., user 110 puts finger on touchscreen display 104 at GUI object). In these instances, the user reaction time, and device motion 108, may not affect the selection of a particular portion of touchscreen display 104, i.e., a particular key, because, from the perspective of user 110, touchscreen device 102 is stationary (or moving in the same relative direction and at the same velocity as user 110).

However, in some instances, device motion 108 may vary between the input decision time and the input instant. If user 110 is using device 102 and receives a change in device motion 108 (e.g., a sudden jolt while walking, driving, etc., and using device 102) between the user input decision time and the input instant, input instrument 112 may be deviated from touching the particular portion of touchscreen display 104 and may contact a portion that user 110 did not intend to touch. In other words, user 110 may "miss" a target area of touchscreen display 104 because of an unexpected change in device motion 108. User motion 114 may have intended to select a particular GUI object 106 and may select another portion of touchscreen display 104 instead, e.g. a different key.

Device 102 may include a motion sensor, such as an accelerometer and/or gyroscope (not shown in FIG. 1), capable of detecting and recording device motion 108, which may include a change in velocity/acceleration/orientation of device 102.

The motion sensor may detect instances of device motion 108 between the input decision time and the input instant. For example, the motion sensor may provide information at predetermined intervals regarding the device motion 108 from which the changes in device motion 108 may be determined Device 102 may determine coordinates of an area that is touched by input instrument 112. Device 102 may compensate for the changes in device motion 108 by adjusting the coordinates of the area actually touched by input instrument 112 based on the changes in device motion 108, as described below.

According to one implementation, device 102 may include a motion sensor, such as a gyroscope, which may detect changes in the orientation of device 102. Changes in the orientation of device 102 may contribute to a deviation from the intended portion of touchscreen display 104. The motion sensor may measure orientation at each instance and provide the information to be used in determining the change in orientation of device 102 over the duration of the input motion interval.

According to one implementation, device 102 may include a motion sensor that is capable of selection motion 116 of the input instrument in a three-dimensional (3D) field. The motion sensor may detect angular acceleration of the input instrument 112, and project the vector value of the angular acceleration component of selection motion 116 to the plane of display screen. Device 102 may use this vector to approximate the distance in XY coordinates of the screen, for compensation distance.

Although the particular implementation discussed is described with respect to input provided to a touchscreen display and Cartesian coordinates of the input in two dimensions, principles disclosed herein may be implemented in different systems that may include a 3D input entry field, such as a 3D motion gaming application. Additionally, although GUI objects 106 may include different types of buttons, menu items, icons, cursors, arrows, textboxes, images, text, selectable list box, hyperlinks, etc., GUI objects 106 in FIG. 1 are illustrated as windows with GUI alphanumeric keypads.

Figure 2:
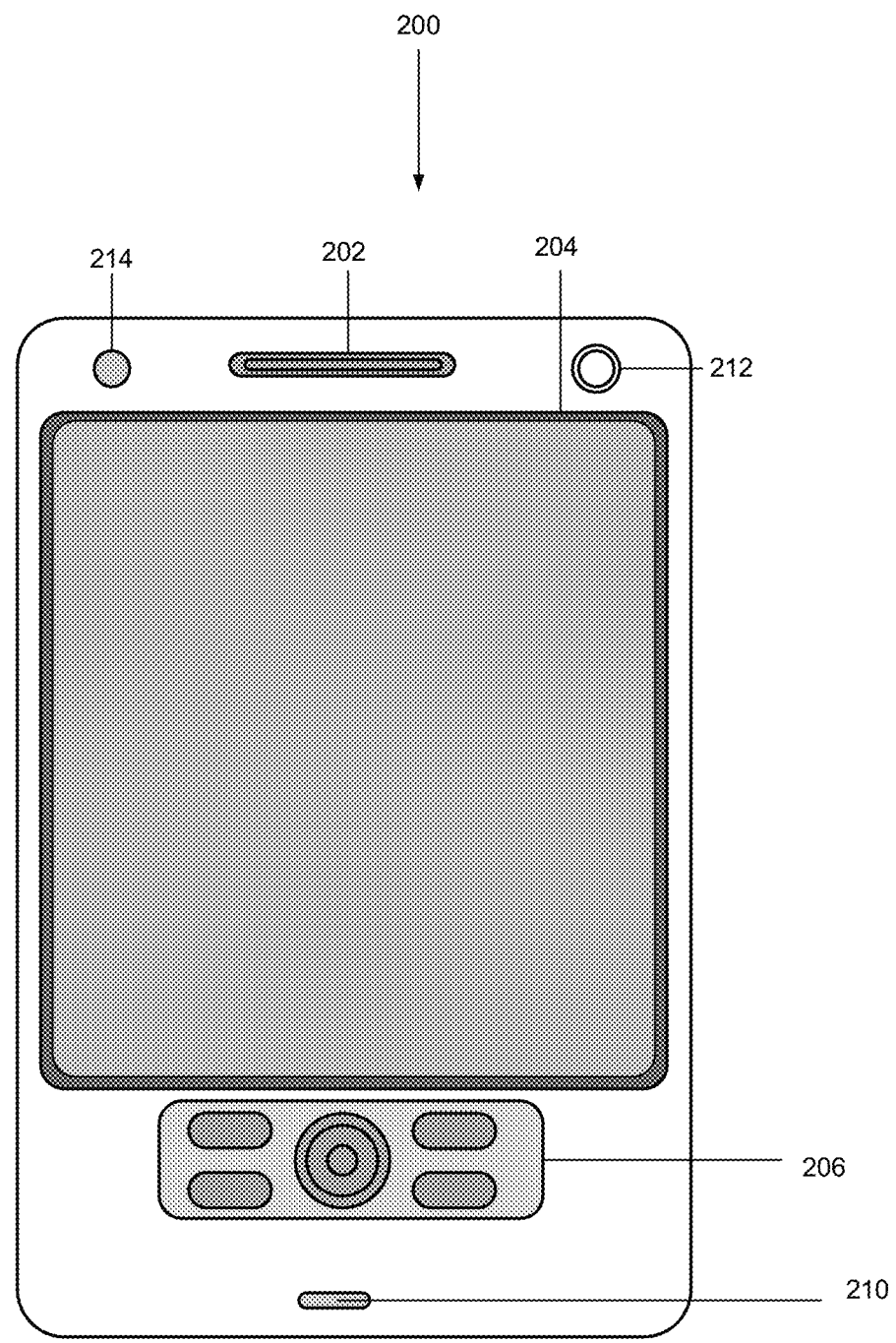
FIG. 2 is a diagram of an exemplary device that implements the concepts described herein.

FIG. 2 is a diagram of an exemplary device 200 in which the concepts described herein may be implemented. Device 200 may include any of the following devices: a mobile telephone; a cellular phone; a personal communications system (PCS) terminal that may combine a cellular radiotelephone with data processing, facsimile, and/or data communications capabilities; an electronic notepad, a tablet computer, a laptop, and/or a personal computer; a personal digital assistant (PDA) that can include a telephone; a gaming device or console; a peripheral (e.g., wireless headphone); a digital camera; or another type of computational or communication device that combines a touchscreen and a sensor capable of determining the motion of the device.

In this implementation, device 200 may take the form of a mobile phone (e.g., a cell phone). As shown in FIG. 2, device 200 may include a speaker 202, a touchscreen display 204, control buttons 206, a microphone 210, sensors 212, a front camera 214, and a housing 216. Speaker 202 may provide audible information to a user of device 200.

Display 204 may provide visual information to the user, such as an image of a caller, video images, or pictures. In addition, display 204 may include a touchscreen for providing input to device 200. Display 204 may provide hardware/software to detect the coordinates of an area that is touched by user 110. For example, display 204 may include a display panel, such as a liquid crystal display (LCD), organic light-emitting diode (OLED) display, and/or another type of display that is capable of providing images to a viewer. Display 204 may include a transparent panel/surface for locating the position of a finger or an object (e.g., stylus) when the finger/object is touching or is close to display 204.

In one implementation, display 204 may generate an electric field at its surface and detect changes in capacitance and the electric field due to a nearby object. A separate processing unit (not shown) that is attached to an output of display 204 may use the output of display 204 to generate the location of disturbances in the electric field, and thus the location of the object (i.e., the touch input).

Control buttons 206 may permit the user to interact with device 200 to cause device 200 to perform one or more operations, such as place or receive a telephone call. In some implementations, control buttons 206 may include a telephone keypad (not shown) that may be complementary to GUI objects generated on touchscreen display 204. Microphone 210 may receive audible information from the user. Sensors 212 may collect and provide, to device 200, information (e.g., acoustic, infrared, etc.) that is used to aid the user in capturing images or in providing other types of information (e.g., a distance between a user and device 200). Front camera 214 may enable a user to view, capture and store images (e.g., pictures, video clips) of a subject in front of device 200. Housing 216 may provide a casing for components of device 200 and may protect the components from outside elements.

Figure 3:
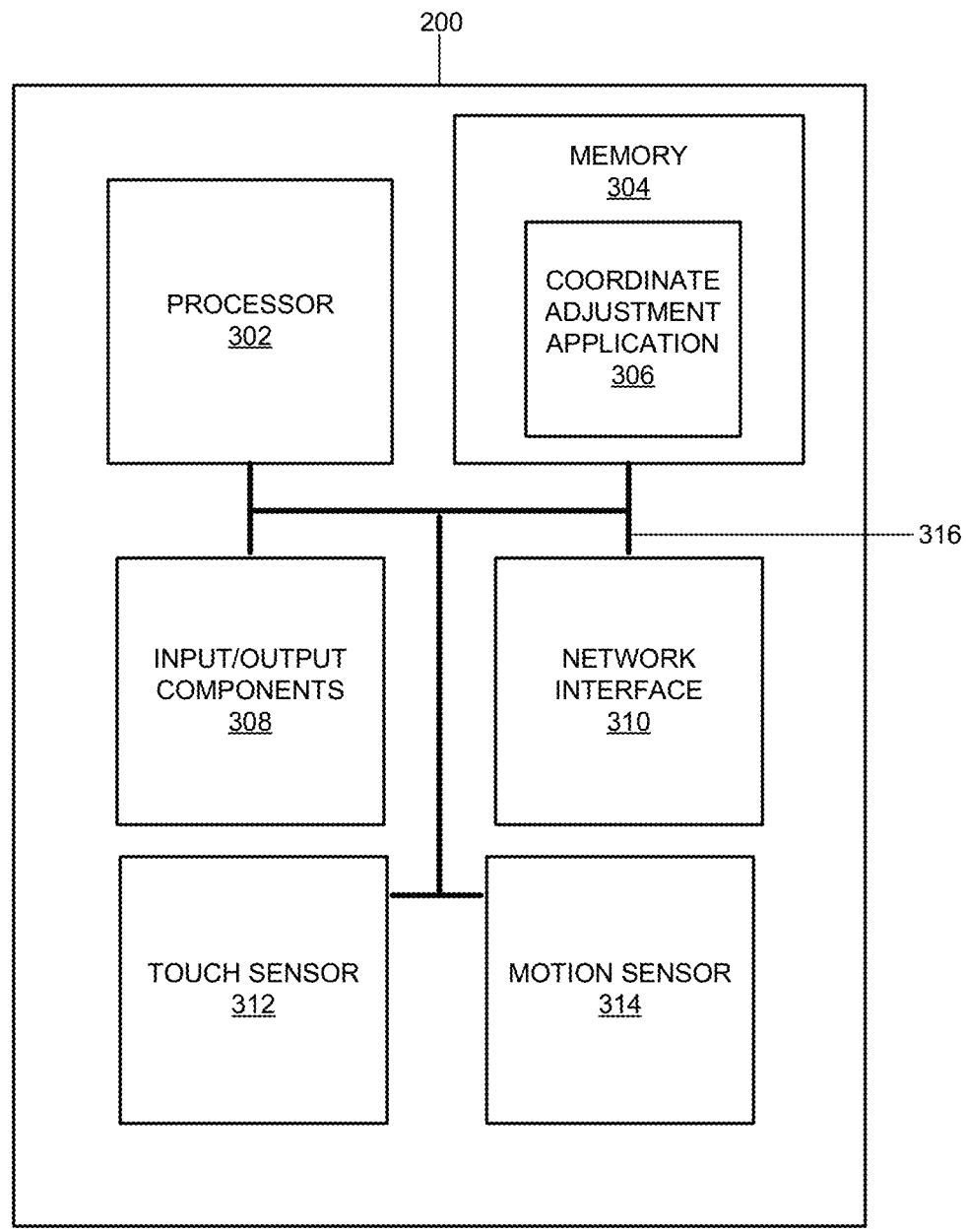
FIG. 3 is a block diagram of the device of FIG. 2.

FIG. 3 is a block diagram of the device of FIG. 2. As shown in FIG. 3, device 200 may include a processor 302, a memory 304, input/output components 308, a network interface 310, a touch sensor 312, a motion sensor 314, and a communication path 316. In different implementations, device 200 may include additional, fewer, or different components than the ones illustrated in FIG. 2. For example, device 200 may include additional network interfaces, such as interfaces for receiving and sending data packets.

Processor 302 may include a processor, a microprocessor, an Application Specific Integrated Circuit (ASIC), a Field Programmable Gate Array (FPGA), and/or other processing logic (e.g., audio/video processor) capable of processing information and/or controlling device 200.

Memory 304 may include static memory, such as read only memory (ROM), and/or dynamic memory, such as random access memory (RAM), or onboard cache, for storing data and machine-readable instructions. Memory 304 may also include storage devices, such as a floppy disk, CD ROM, CD read/write (R/W) disc, and/or flash memory, as well as other types of storage devices.

Memory 304 may include a coordinate adjustment application 306. Coordinate adjustment application 306 may include data and machine-readable instructions to adjust coordinates received by device 200 based on data regarding motion of device 200. Coordinate adjustment application 306 may be executed by processor 302. Coordinate adjustment application 306 may adjust coordinates indicated by a touch input applied to touchscreen display 104. Coordinate adjustment application 306 may adjust the coordinates based on a change in device motion 108 to approximate a touch input to device 102 that occurs with a constant device motion 108 (i.e., without a change in device motion 108).

Input/output components 308 may include a display screen (e.g., touchscreen display 104, touchscreen display 204, etc.), a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to device 200.

Network interface 310 may include any transceiver-like mechanism that enables device 200 to communicate with other devices and/or systems. For example, network interface 310 may include mechanisms for communicating via a network, such as the Internet, a terrestrial wireless network (e.g., a WLAN), a cellular network, a satellite-based network, a WPAN, etc. Additionally or alternatively, network interface 310 may include a modem, an Ethernet interface to a LAN, and/or an interface/ connection for connecting device 200 to other devices (e.g., a Bluetooth interface).

Touch sensor 312 may provide information regarding contact received from user 110 at a particular portion of a touchscreen display of device 200. Touch sensor 312 may be embedded/integrated into touchscreen display 104.

Motion sensor 314 may include accelerometer, gyroscope, etc. that provides information regarding device motion 108 of device 200. Motion sensor 314 may periodically determine device motion 108 of device 200. In one implementation, motion sensor 314 may determine values associated with device motion 108, such as a velocity and direction of device 200 using a multiple coordinate system/reference, such as a Cartesian coordinate system, Euler angles or Tait-Bryan angles, that intersects/overlaps with a conceptual representation of touchscreen display 104 and provide the values to be used in determining adjusted coordinates for a touch input applied to a touchscreen display 204 of device 200. Motion sensor 314 may determine values that incorporate device motion 108 around a center of mass of device 102 including tilt, turn, yaw, pitch, and roll of device 102. Motion sensor 314 may also determine a change in orientation of touchscreen display 104.

Communication path 316 may provide an interface through which components of device 200 may communicate with one another.

FIG. 4A is a coordinate adjustment data flow diagram 400 for a portion of device 102. As shown in FIG. 4A, coordinate adjustment data flow diagram 400 includes touch sensor 312, motion sensor 314, a coordinate adjustment application 306, and a primary application 430. The particular arrangement and number of components in data flow diagram 400 as shown in FIG. 4A is illustrated for simplicity.

Figure 4B:
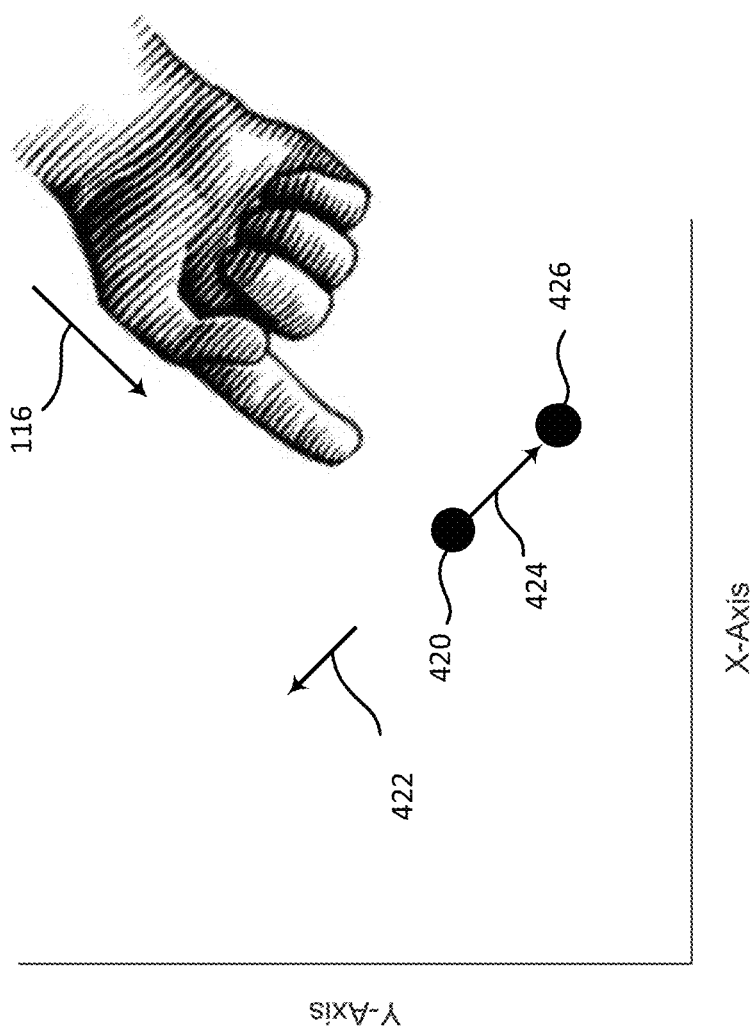
FIG. 4B is a conceptual representation diagram that is associated with adjusting coordinates in a touchscreen display.

FIG. 4A is described with respect to FIG. 4B, which illustrates a conceptual representation diagram 450 that is associated with adjusting coordinates in a touchscreen display.

As shown in FIG. 4A, touch sensor 312 may output coordinates 420 of a portion of touchscreen display 104 in response to a touch input from a user received on a portion of touchscreen display 104 (e.g., from user 110 using input instrument 112 as described with respect to FIG. 1 hereinabove). Touch sensor 312 may receive the touch input when user 110 attempts to select a particular GUI object 106 on touchscreen display 104. Touch sensor 312 may identify coordinates 420 of a portion of touchscreen 204 touched by input instrument 112 based on Cartesian coordinates of the particular portion of touchscreen display 104. Touch sensor 312 may provide coordinates 420 to coordinates adjustment module 416.

Motion sensor 314 may determine information regarding device motion 108 of device 102 relevant to the selection of coordinates 420. The information may include the device motion 108 (e.g., angular acceleration, velocity, orientation, etc.) at predetermined instances/intervals. Motion sensor 314 may provide the values of device motion 108 to motion module 412. Alternatively, motion sensor 314 may record and retain device motion 108 values and provide values relevant to a particular selection of coordinates 420 to motion module 412 in response to a request from motion module 412 (i.e., device motion 108 determined over a particular input motion interval). Motion sensor 314 may also provide information regarding an orientation of device 102. The input motion interval is a time that ends at the input instant during which changes in device motion 108 may affect the accuracy of the touch input.

Coordinate adjustment application 306 includes motion module 412, and coordinates adjustment module 416.

Coordinates adjustment module 416 may receive coordinates 420 of the selected portion of touchscreen display 104 from touch sensor 312 when user 110 touches touchscreen display 104. In some instances, device 102 may be subject to a change in device motion 108 that may affect an accuracy of selection of coordinates 420. For example, coordinates adjustment module 416 may receive coordinates 420 when user 110 touches touchscreen display 104 concurrent to a motor vehicle in which user 110 is being carried going over a pothole. The car's movement over the pothole may cause device 102 to shift and the touch to be placed at a different portion of touchscreen display 104 than the portion of touchscreen display 104 intended by user 110.

Motion module 412 may receive values, for device motion 108, that include values beginning at a start of the input motion interval. The input motion interval may be selected as a predetermined time interval preceding the input instant at which input instrument 112 touches touchscreen display 104 (i.e., device motion 108 that occurs in a time frame that may affect the selection of coordinates 420). The predetermined time interval may be selected based on an estimated user response time. The user response time may include a time between a start of the particular portion of touchscreen display 104 and an actual instant that input instrument 112 touches touchscreen display 104. The response time may be estimated based a typical/average user response time. A typical reaction time may span time in the order of hundreds of milliseconds.

Motion module 412 may analyze the values for device motion 108 over the predetermined time interval and determine a positional vector 422 (e.g., as shown in FIG. 4B) for device 102 that includes the change in velocity and/or direction over the predetermined time interval. Positional vector 422 may provide a two dimensional representation of motion in the multiple coordinate system. Positional vector 422 may indicate that the change in device motion 108 over the predetermined time interval moved points in touchscreen display 104 a distance (or units) indicated by positional vector 422 (i.e., a number of units in the multiple coordinate system). Because user 110 and device 102 may receive multiple jolts, the acceleration may change during the response time. Device 102 may sample the acceleration many times in the response time interval, to accurately integrate over the varying acceleration.

Motion module 412 may determine positional vector 422 based on an orientation of each touchscreen display 104. For example, device 102 may include multiple touchscreen displays 104. Motion module 412 may identify components of device motion 108, such as a angle, yaw, pitch and roll of a particular touchscreen display 104 of device 102 based on device motion 108. Motion module 412 may determine positional vector 422 based on of the components of device motion 108. For example, if user 110 is positioned with respect to device 102 such that a change in device motion 108 (i.e., acceleration, deceleration and/or change in direction of device 102) is at an angle that is substantially perpendicular to the plane of touchscreen display 104, motion module 412 may determine a relatively smaller value for compensatory motion vector 424 when compared to a compensatory motion vector 424 for changes in device motion 108 that occur in the plane of touchscreen display 104 (e.g., the change in device motion 108 occurs across a face of device 102).

Motion module 412 may also determine a compensatory motion vector 424 (e.g., as shown in FIG. 4B) that balances positional vector 422. In other words, compensatory motion vector 424 may be an opposite motion vector to positional vector 422. Compensatory motion vector 424 may be an equal and opposite vector to positional vector 422 in terms of both change in acceleration and direction.

As shown in FIG. 4B, coordinates adjustment module 416 may receive coordinates 420 from touch sensor 312 and compensatory motion vector 424 from motion module 412. Coordinates adjustment module 416 may adjust a position of coordinates 420 based on compensatory motion vector 424. Coordinates adjustment module 416 may provide GUI objects 106 that correspond to adjusted coordinates 426 to primary application 430.

Primary application 430 may combine the adjusted coordinates 426 and/or identified GUI objects 106 determined based on the adjusted coordinates 426 with additional predictive processes to refine the adjustments of touch input received from user 110. For example, additional predictive process may include a spell check program that may further adjust the coordinates 426. Primary application 430 may be an email program, a texting program, a web browser, a word processing program or a gaming application. In one example, coordinate adjustment application 306 may perform an initial correction of alphanumeric input provided by user 110, such as a word "if8de" to "iclude" based on changes in device motion 108. Primary application 430 may include a spell check program that further corrects "iclude" to a word included in an associated database, such as "include".

Figure 5:
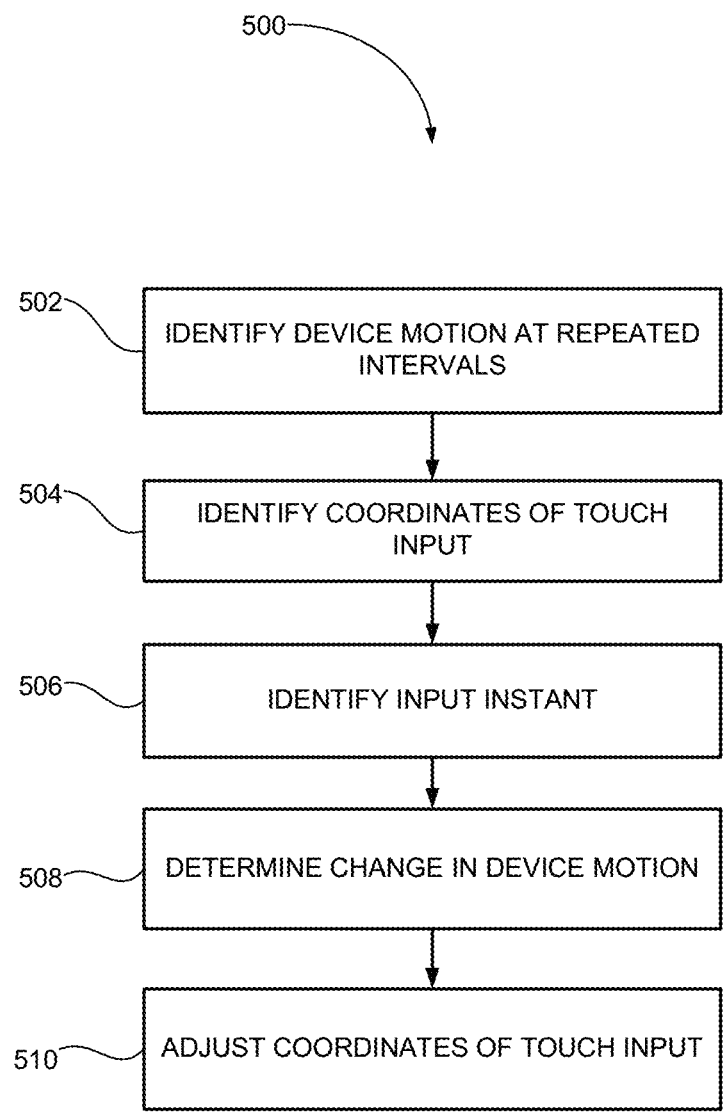
FIG. 5 is a flow diagram of an exemplary process associated with adjusting coordinates of a touch input.

According to one implementation, device 102 may provide a feedback mechanism to fine tune to particular user input. For example, device 102 may identify optimal response time for individual users based on a test, such as one described below with respect to FIG. 6 and process 600. The compensatory motion vectors 424 may increase in value for users that have slower response times FIG. 5 is a flow chart of an exemplary process for adjusting coordinates of a touch input described herein. Process 500 is described with respect to conceptual representation 450. In one implementation, process 500 may be performed by device 102. In another implementation, some or all of process 500 may be performed by another device or group of devices, including or excluding device 102.

Assume that display 104 is displaying a plurality of GUI objects 106. Process 500 may start with motion sensor 314 identifying a device motion 108 of device 102 at repeating intervals (e.g., motion sensor 314 may identify device motion 308 after time intervals that are one fifth of an input motion interval) (block 502). Motion sensor 314 may identify a velocity and a direction of device motion 108.

At block 504, device 102 may identify coordinates of a touch input to touchscreen display 104. For example, a user 110 may apply a touch input to touchscreen display 104 directed towards a particular GUI object 106 at particular coordinates.

At block 506, device 102 may identify an input instant at which the touch input was received.

Device 102 may determine a change in device motion 108 that may affect an accuracy of the touch input based on the input instant (block 508). For example, device 102 may request values for device motion 108 for an input motion interval from motion sensor 314. Device 102 may determine a change in device motion 108 based on device motion values 108 measured at each repeating interval within the input motion interval.

Device 102 may adjust the coordinates of the touch input based on the change in device motion 108. For example, as shown in FIG. 4B, device 102 may adjust the coordinates 420 of the touch input using a compensatory motion vector 424 that incorporates the change in device motion 108 in units corresponding to that of coordinates of the GUI objects represented via touchscreen display 104.

Figure 6:
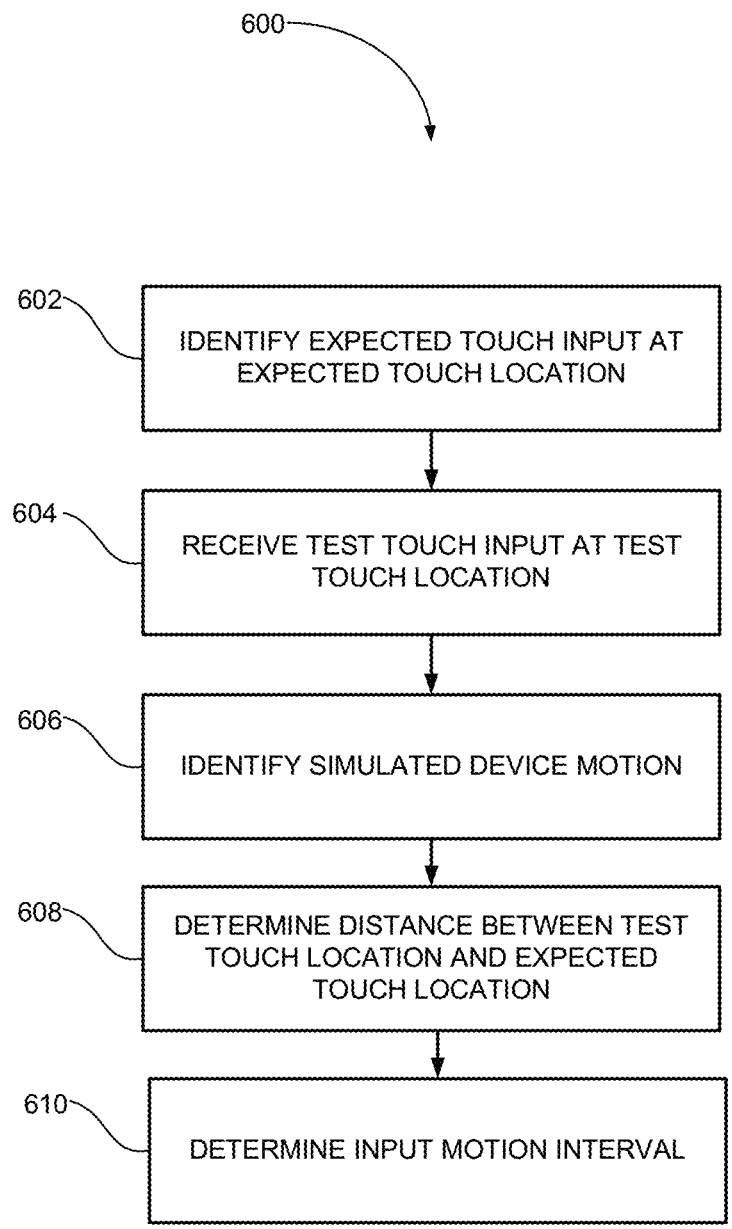
FIG. 6 is a flow diagram of an exemplary process for determining an input motion interval.

FIG. 6 is a flow diagram of an exemplary process 600 for determining an input motion interval. Process 500 is described with respect to conceptual representation 450. In some implementations, process 500 may be performed by device 102. In another implementation, some or all of process 600 may be performed by another device or group of devices, including or excluding device 102.

Assume that touchscreen display 104 is displaying a plurality of GUI objects 106. Process 500 may start with device 102 identifying expected touch inputs that are to be input by user 110 (block 602). Each expected touch input may have an expected touch location. For example, device 102 may provide a list of touch inputs (e.g., a test message) that is to be entered at touchscreen display 104. User 110 may enter the expected touch inputs under controlled conditions, such as in an otherwise stationary environment. During the input, the GUI of device 102 may be moved or "scrolled" randomly.

Device 102 may receive test touch inputs from user 110 (block 604). For example, user 110 may type the test message into device 102 via touchscreen display 104. Device 102 may receive test touch inputs at test touch locations on touchscreen display 104.

Device 102 may identify simulated device motion 108 (block 606). For example, device 102 may randomly scroll GUI objects 106 on touchscreen display 104 at a speed corresponding to a change in device motion 108, such as a change in device motion 108 received when a user 110 and device 102 are jostled on a public train.

Device 102 may determine a distance between the test touch location and the expected touch location (block 608). For example, device 102 may measure a distance between coordinates of the test touch location and the coordinates of the expected touch location.

Device 102 may determine an input motion interval (block 610). For example, device 102 may determine the input motion interval based on the magnitude of the distance between the location of the test touch input and the expected touch input and a simulated device motion provided by device 102 preceding the input instant. The magnitude of the distance between the location of the test touch input and the expected touch input may be related to the length of the input motion interval (measured in units of time, such as microseconds, etc.). If user 110 enters test touch inputs at a slower pace or response time, the distance from the expected touch location to the test touch location caused by changes in device motion 108 may increase accordingly.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, while series of blocks have been described with respect to FIGS. 5 and 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code–it being understood that software and control hardware can be designed to implement these aspects based on the description herein.

Although the implementations described above mainly refer to a adjusting touch input of a device based on device motion, in other implementations, other types of input may be adjusted based on motion associated with a receiving device or an input entity.

It should be emphasized that the term "comprises/comprising" when used in this specification is taken to specify the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
   a touch sensor for determining portions, of a touchscreen display, that receive touch inputs;
   a motion sensor for identifying device motions of the device; and
   a processor to:
   identify coordinates of a portion, of the touchscreen display, that receives a touch input;
   identify an input instant, wherein the input instant is an instant at which the touchscreen display receives the touch input;
   determine device motion, including angular acceleration, velocity and orientation, during a input motion interval ending at the input instant and having a predetermined duration that is an estimated user response time, the device motion affects an accuracy of the coordinates of the touch input;
   determine a positional vector that is a two dimensional representation of the device motion in a plane of the touch screen taken from components of the device motion; and
   adjust the coordinates with a compensation motion vector that is equal in magnitude and opposite in direction to the positional vector.

2. The device of claim 1, wherein the processor is further configured to:
   associate the adjusted coordinates with a graphical user interface (GUI) object located at the adjusted coordinates at the input instant.

3. The device of claim 1, wherein the processor is further configured to:
   determine an output associated with the touch input based on the adjusted coordinates, and further adjust the output using a secondary predictive process.

4. The device of claim 1, wherein, when determining the change in device motion, the processor is further to:
   receive a plurality of device motion values over the input motion interval; and
   determine the device motion based on the plurality of device motion values.

5. The device of claim 4, wherein, when identifying the input motion interval, the processor is further configured to:
   provide a simulated touch input test that includes a configuration of graphical user interface (GUI) objects displayed on the touchscreen display and that move relative to the touchscreen display to simulate device motion; and
   determine the input motion interval based on the simulated touch input test.

6. The device of claim 5, wherein, when determining the input motion interval based on the simulated touch input test, the processor is further configured to:
   identify an expected touch input at an expected touch location;
   receive a test touch input at a test touch location;
   identify a simulated device motion associated with the test touch input;
   determine a distance between the test touch location and the expected touch location; and
   determine the input motion interval based on the simulated device motion and the distance between the test touch location and the expected touch location.

7. The device of claim 1, wherein the device includes:
   a cell phone, a tablet, an electronic notepad, a gaming console, a laptop computer, a personal digital assistant, or a personal computer.

8. The device of claim 1, wherein the processor is further configured to:
   determine the orientation based on one or more of a yaw, pitch, or roll of the device in a multi-coordinate system.

9. The device of claim 1, wherein the processor is further configured to:
   provide the adjusted coordinates as an input for a primary application, wherein the primary application includes one of an email program, a texting program, a web browser, and a gaming application.

10. A computer-implemented method comprising:
    identifying coordinates of a portion, of a touchscreen display of a device, that receives a touch input;
    identifying an input instant, wherein the input instant is an instant at which the touchscreen display receives the touch input;
    determining device motion, including angular acceleration, velocity and orientation, during a input motion interval ending at the input instant and having a predetermined duration that is an estimated user response time, the device motion affects an accuracy of the coordinates of the touch input;
    determining a positional vector that is a two dimensional representation of the device motion in a plane of the touch screen taken from components of the device motion; and
    adjusting the coordinates with a compensation motion vector that is equal in magnitude and opposite in direction to the positional vector.

11. The computer-implemented method of claim 10, further comprising:
    associating the adjusted coordinates with a graphical user interface (GUI) object located at the adjusted coordinates.

12. The computer-implemented method of claim 10, further comprising:
  determining an output associated with the touch input based on the adjusted coordinates; and
  further adjusting the output using a secondary predictive process.

13. The computer-implemented method of claim 10, wherein determining the change in device motion further comprises:
  receiving a plurality of device motion values over the input motion interval; and
  determining the device motion based on the plurality of device motion values.

14. The computer-implemented method of claim 13, wherein identifying the input motion interval further comprises:
  providing a simulated touch input test that includes a configuration of graphical user interface (GUI) objects displayed on the touchscreen display and that move relative to the touchscreen display to simulate device motion; and
  determining the input motion interval based on the simulated touch input test.

15. The computer-implemented method of claim 14, wherein determining the input motion interval based on the simulated touch input test further comprises:
  identifying an expected touch input at an expected touch location;
  receiving a test touch input at a test touch location;
  identifying a simulated device motion associated with the test touch input;
  determining a distance between the test touch location and the expected touch location; and
  determining the input motion interval based on the simulated device motion and the distance between the test touch location and the expected touch location.

16. The computer-implemented method of claim 10, further comprising:
  determining the orientation based on one or more of a yaw, pitch, or roll of the device in a multi-coordinate system.

17. The computer-implemented method of claim 10, further comprising:
  providing the adjusted coordinates as an input for a primary application, wherein the primary application includes one of an email program, a texting program, a web browser, and a gaming application.

* * * * *